(12) United States Patent
Hayden et al.

(10) Patent No.: US 11,732,927 B2
(45) Date of Patent: Aug. 22, 2023

(54) SYSTEMS AND METHODS FOR PREVENTING AND REMOVING CHEMICAL DEPOSITS IN A FLUID HEATING DEVICE

(71) Applicant: Rheem Manufacturing Company, Atlanta, GA (US)

(72) Inventors: Christopher M. Hayden, Waterbury, CT (US); Sergiu G. Mihu, Waterbury, CT (US); Eric R. Jurczyszak, Waterbury, CT (US)

(73) Assignee: Rheem Manufacturing Company, Atlanta, GA (US)

(*) Notice: Subject to any disclaimer, the term of this patent is extended or adjusted under 35 U.S.C. 154(b) by 0 days.

(21) Appl. No.: 16/844,071

(22) Filed: Apr. 9, 2020

(65) Prior Publication Data
US 2021/0318030 A1 Oct. 14, 2021

(51) Int. Cl.
*F24H 9/00* (2022.01)
*B06B 1/02* (2006.01)
(Continued)

(52) U.S. Cl.
CPC ......... *F24H 9/0042* (2013.01); *B06B 1/0238* (2013.01); *B01F 31/80* (2022.01);
(Continued)

(58) Field of Classification Search
CPC .. B01F 11/02; B01F 31/80; C02F 1/36; F24H 9/0042; B06B 1/0238; B06B 2201/71;
(Continued)

(56) References Cited

U.S. PATENT DOCUMENTS

| 3,651,352 | A | | 3/1972 | Puskas |
| 5,109,174 | A | * | 4/1992 | Shewell ............... B06B 1/0276 310/317 |

(Continued)

FOREIGN PATENT DOCUMENTS

| CN | 103336145 A | * | 10/2013 | |
| GB | 2227254 A | * | 7/1990 | ................ C02F 1/36 |

(Continued)

OTHER PUBLICATIONS

JP-2007130250-A, translation from publication year 2007.*
(Continued)

*Primary Examiner* — Steven S Anderson, II
*Assistant Examiner* — Andrew W Cheung
(74) *Attorney, Agent, or Firm* — Eversheds Sutherland (US) LLP

(57) ABSTRACT

The disclosed technology includes a fluid heating device that can include a heating chamber in communication with a heating element, and an ultrasonic transducer in communication with the heating chamber and for transmitting ultrasonic sound waves. The disclosed technology includes an ultrasonic transducer system that includes an assembly configured to attach to a fluid heating device, and an ultrasonic transducer affixed to the assembly. The disclosed technology also includes a method for ultrasonic cleaning within a fluid heating device that can include a controller configured to receive flow data from a flow sensor; based on the flow data, determine that fluid is flowing through a heating chamber; and output instructions for an ultrasonic transducer to output ultrasonic sound waves.

11 Claims, 6 Drawing Sheets

(51) Int. Cl.
   *B08B 3/12* (2006.01)
   *B01F 31/80* (2022.01)
   *C02F 1/36* (2023.01)
   *G01F 1/66* (2022.01)
(52) U.S. Cl.
   CPC .............. *B06B 2201/71* (2013.01); *B08B 3/12* (2013.01); *C02F 1/36* (2013.01); *G01F 1/66* (2013.01)
(58) Field of Classification Search
   CPC ..... B08B 3/12; B08B 9/055; B08B 2209/005; G01F 1/66
   USPC .......................................................... 122/379
   See application file for complete search history.

(56) References Cited

U.S. PATENT DOCUMENTS

| | | | | |
|---|---|---|---|---|
| 5,151,883 | A * | 9/1992 | Mitome | B06B 1/02 310/334 |
| 5,566,649 | A * | 10/1996 | Norris | F28G 7/00 165/95 |
| 5,611,993 | A * | 3/1997 | Babaev | A61L 2/025 210/748.03 |
| 6,071,473 | A * | 6/2000 | Darwin | A61L 2/025 422/186 |
| 6,079,508 | A * | 6/2000 | Caza | B09C 1/02 175/207 |
| 6,505,648 | B1 * | 1/2003 | Gergely | B01D 19/0078 138/44 |
| 6,719,449 | B1 * | 4/2004 | Laugharn, Jr. | B01F 35/2115 366/127 |
| 6,736,535 | B2 * | 5/2004 | Halsall | F24D 19/0092 366/144 |
| 6,880,402 | B1 * | 4/2005 | Couet | E21B 34/066 73/1.49 |
| 7,267,727 | B2 * | 9/2007 | McDermott | B08B 7/0021 257/E21.255 |
| 7,299,742 | B2 * | 11/2007 | Meineke | F24H 9/0042 99/283 |
| 7,846,341 | B2 * | 12/2010 | Babaev | A61L 2/02 210/748.01 |
| 9,518,760 | B2 * | 12/2016 | Doglioni Majer | A47J 31/60 |
| 2003/0223305 | A1 * | 12/2003 | Halsall | F24D 19/0092 366/127 |
| 2013/0042893 | A1 * | 2/2013 | Ariessohn | G01N 1/2202 137/560 |
| 2015/0330818 | A1 * | 11/2015 | Leaders | G01F 1/663 73/861.28 |
| 2016/0187894 | A1 * | 6/2016 | Malky | F24D 19/1009 700/276 |
| 2017/0082650 | A1 * | 3/2017 | Hies | G01P 5/245 |
| 2017/0122575 | A1 * | 5/2017 | Acker | G05B 15/02 |
| 2019/0041095 | A1 * | 2/2019 | Boros | F24H 1/107 |

FOREIGN PATENT DOCUMENTS

| | | | |
|---|---|---|---|
| JP | 2007130250 | A * | 5/2007 |
| RU | 58792 | U1 | 11/2006 |
| RU | 63561 | U1 | 5/2007 |
| RU | 68931 | U1 | 12/2007 |
| RU | 2346760 | C2 | 2/2009 |
| RU | 169332 | U1 | 3/2017 |

OTHER PUBLICATIONS

International Search Report and Written Opinion for International (PCT) Application No. PCT/US2021/026097 dated Jul. 8, 2021.

* cited by examiner

SYSTEMS AND METHODS FOR PREVENTING AND REMOVING CHEMICAL DEPOSITS IN A FLUID HEATING DEVICE

FIELD OF THE DISCLOSURE

The presently disclosed subject matter relates generally to an enhanced fluid heating device and, more particularly, to systems and methods for preventing or reducing chemical deposits on heating elements of a fluid heating device using one or more ultrasonic transducers.

BACKGROUND

Water heating systems can be used in a variety of applications, including industrial and residential applications. A major problem associated with water heating systems is that scale can form on a heating element or interior wall of a heating chamber in contact with water. Scale can occur when the water that flows through a water heating system includes mineral contaminants, such as calcium and magnesium. When the water is heated, these mineral contaminants can become deposited onto the surface of heating chambers and heating elements of water heating systems. Instead of flowing through the system, these minerals can cling to the metal surface of a heating chamber or heating elements of the system. Typical signs of scaling include mineral deposits, stains, or a white film forming on a surface, and scaling can often appear on surfaces made of stainless steel, tile, glass, or other materials.

These mineral deposits can build up over time, causing numerous problems with the effectiveness and efficiency of a water heating system. For example, scaling can build up on the interior walls of a heating chamber and heating element or a surface of a tank, causing the flow of water to become restricted. Further, scaling can cause uneven heating of the water. This can be particularly true with tankless water heating systems, as mineral deposits can coat the heating elements, which can inhibit heat transfer from the heating elements to the water and thus making it more difficult for water to receive from the heating elements. Similarly, pressure levels within a heating chamber can become unbalanced, causing a decrease in efficiency of the water heating system. Additionally, scaling can provide an attractive environment for bacteria. Bacteria will commonly migrate towards scaling within water heating systems as a means to escape certain chemicals. Ultimately, scaling can diminish the life span of a water heating system, causing unnecessary financial costs for users and entities.

Removing scaling from the inside of heating chambers of water heating systems can be a difficult and cost-intensive process. One traditional method of removing scaling from heating chambers involves adding vinegar or other chemicals to the tank or heating chamber for a substantial period of time, such as for approximately six hours or more, after which the vinegar or other chemicals must be flushed out. Another traditional method of removing scaling from water heating systems involves the use of a water softener. The water softener removes calcium and magnesium ions that lead to scaling. However, a major challenge of this method is that the water softening chemicals must be consistently replenished, as water heating systems exchange calcium and magnesium ions for another ion, usually sodium. Eventually, the sodium ions will deplete and need to be replaced. Overall, these methods can be labor intensive and generally require direct access to the contaminated surface in order to be effective. Thus, a need exists for an efficient and effective method of reducing and/or preventing scaling within a water heating system with little or no user action required.

SUMMARY

These and other problems can be addressed by embodiments of the technology disclosed herein. The disclosed technology relates to a fluid heating device that includes a heating chamber having a heating element. The disclosed technology includes an ultrasonic transducer that is in communication with the heating chamber and can transmit ultrasonic sound waves into fluid within the heating chamber.

The ultrasonic transducer can be positioned in a variety of locations and configurations. The ultrasonic transducer can be positioned on or in an ultrasonic transducer assembly, on an external surface of the heating chamber, within the heating chamber, proximate to the heating chamber, or any other location from which the ultrasonic transducer can provide ultrasonic sound waves at or near a heating element of the heating chamber. The fluid heating device can include a plurality of ultrasonic transducers arranged in an array that can provide efficient descaling of mineral deposits and prevention of mineral buildup. The fluid heating device can include a controller in electrical communication with components of the fluid heating device. The controller can be capable of receiving information, and outputting instructions to components of the device.

The disclosed technology includes a method for ultrasonic cleaning within a fluid heating device that can include receiving, at a controller, flow data from a flow sensor; determining, by the controller and based on the flow data, that fluid is flowing through a heating chamber; and outputting, by the controller, instructions for an ultrasonic transducer to output ultrasonic sound waves.

The method for ultrasonic cleaning can include transmitting ultrasonic sound waves at a predetermined frequency or a variable frequency and for a predetermined interval or a variable interval.

Additional features, functionalities, and applications of the disclosed technology are discussed in more detail herein.

BRIEF DESCRIPTION OF THE FIGURES

Reference will now be made to the accompanying figures, which are not necessarily drawn to scale, and wherein.

DETAILED DESCRIPTION

Figure 1A:
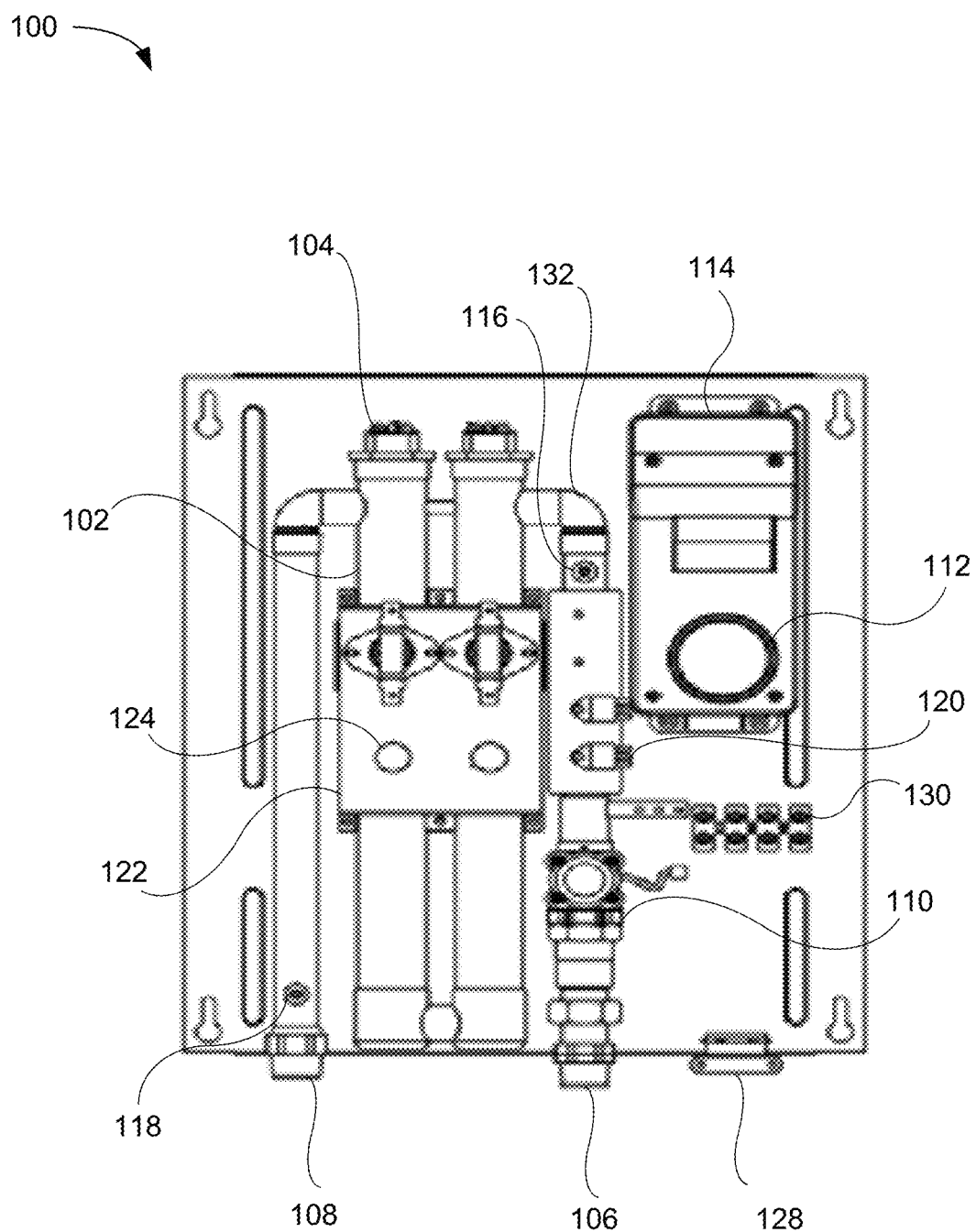
FIG. 1A is a front perspective of a fluid heating device, according to the disclosed technology.

The disclosed technology relates to a fluid heating device that can include a heating chamber in communication with a heating element that is used to heat fluid flowing through the fluid heating device, and an ultrasonic transducer positioned on or near a heating chamber that transmits ultrasonic sound waves within the fluid flowing through the heating chamber. The transmission of ultrasonic sound waves can generate cavitation bubbles that can implode upon reaching an unstable size. The implosion of the cavitation bubble can produce a jet that contacts the interior wall of a heating chamber or a heating element with sufficient force to displace a contaminant particle adhered to the interior wall of the heating chamber or heating element or to agitate the fluid proximate the interior wall of the heating chamber of heating element such that the contaminant particle is prevented from adhering or attaching to the corresponding surface in the first place.

Examples of the disclosed technology are discussed herein with reference to heating "fluid" or "water." It is to be appreciated that the disclosed technology can be used with a variety of fluids, including water. Thus, while some examples may be described in relation to heating water specifically, all examples of the disclosed technology can be used with fluids other than water unless otherwise specified.

The disclosed technology is referenced herein in relation to a "heating chamber," which can reference an area or portion of a fluid heating device in which heat is provided and/or transferred to a fluid. The fluid heating device, and the heating components thereof, can be powered by electricity, gas, or any other fuel source.

The disclosed technology will be described more fully hereinafter with reference to the accompanying drawings. This disclosed technology can, however, be embodied in many different forms and should not be construed as limited to the examples set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein can include, but are not limited to, for example, components developed after development of the disclosed technology.

In the following description, numerous specific details are set forth. But it is to be understood that examples of the disclosed technology can be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," etc., indicate that the embodiment(s) of the disclosed technology so described can include a particular feature, structure, or characteristic, but not every embodiment necessarily includes the particular feature, structure, or characteristic. Further, repeated use of the phrase "in one embodiment" does not necessarily refer to the same embodiment, although it can.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to, and are not intended to imply that the objects so described should be in a given sequence, either temporally, spatially, in ranking, or in any other manner.

Figure 1B:
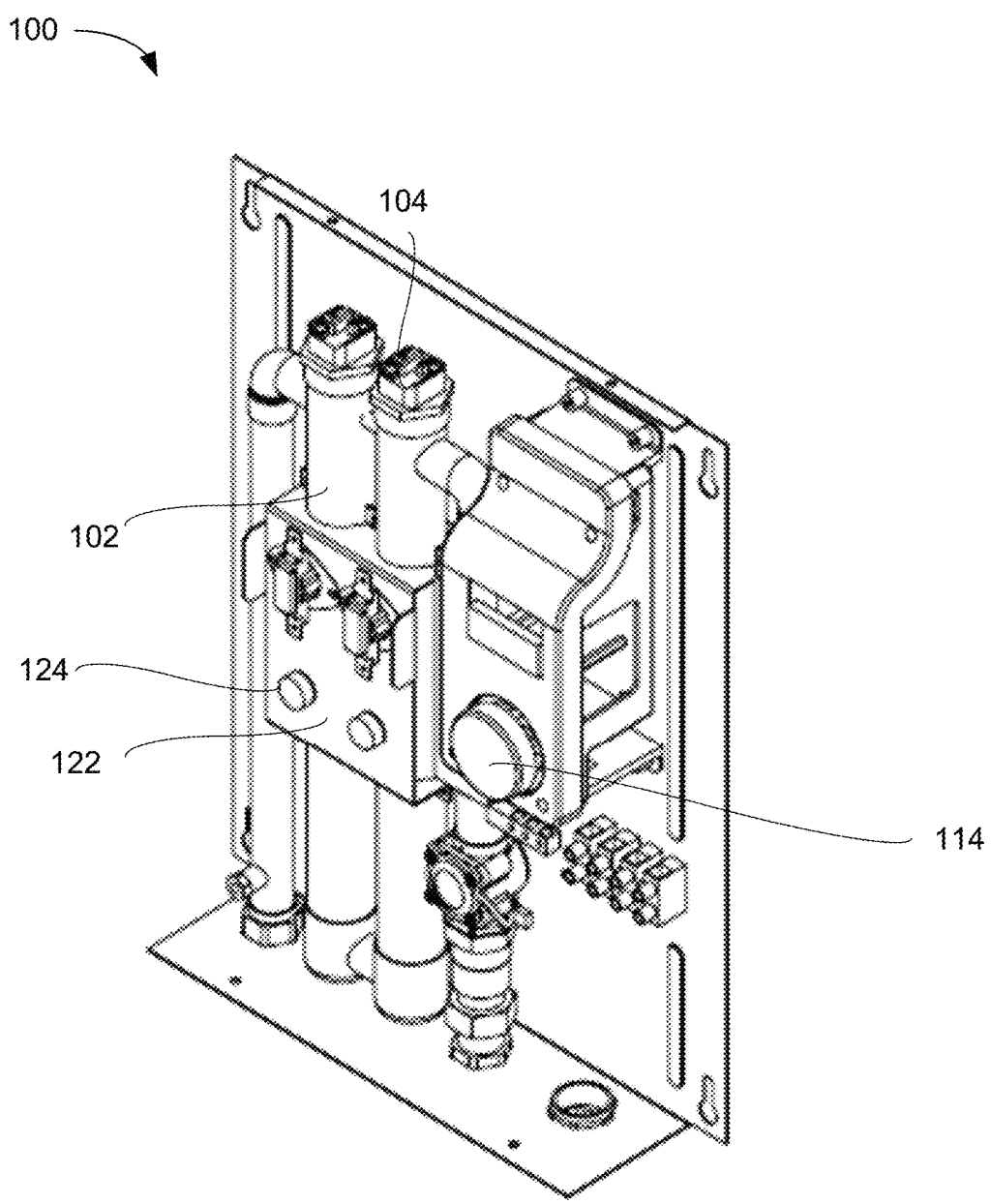
FIG. 1B is a perspective of a fluid heating device, according to the disclosed technology.

FIGS. 1A and 1B illustrate an example fluid heating device 100 that includes an ultrasonic transducer 124. The ultrasonic transducer 124 can generate and transmit ultrasonic sound waves 202. While FIGS. 1A and 1B depict a particular arrangement of certain components, the disclosed technology is not so limited but also includes other arrangements that use additional or fewer components.

The fluid heating device 100 can include a heating chamber 102, a heating element 104, a flow sensor 110, one or more temperature sensor(s) 116, 118, a controller 114, and an ultrasonic transducer assembly 122. The fluid heating device 100 can include a single heating chamber 102. Alternatively, the fluid heating device 100 can include multiple heating chambers 102. Regardless of the number of heating chambers 102, each heating chamber 102 can include a heating element 104, for example, as illustrated in FIG. 1A. Alternatively, a given heating chamber 102 can include multiple heating elements 104. Each heating element 104 can be made of metal, such as copper, nickel, aluminum, molybdenum, iron, tungsten, or an alloy including these and/or other materials. The heating element 104 can have any useful form or shape. For example, the heating element can be a wire, ribbon, or can comprise metal foil. The heating element 104 can include ceramic, plastic, or silicone impregnated with a conductor. The heating element 104 can be an electrical resistance heating element, which can convert electrical energy into thermal energy when the heating element 104 is subject to an electrical current.

The flow sensor 110 can be electrical communication with the controller 114. The flow sensor 110 can be positioned near the fluid inlet 106, as illustrated in FIG. 1A, although the flow sensor 110 can be positioned in other positions provided the flow sensor 110 is in a position where it can detect whether fluid is flowing through or out of the fluid heating device 100. The flow sensor 110 can be configured to detect the flow of fluid through or out of the heating chamber 102 and can transmit flow data to the controller 114.

The fluid heating device 100 can include one or more temperature sensors 116, 118 that are located at one or more locations within or near the fluid heating device, and the temperature sensor(s) 116, 118 can be in electrical communication with the controller 114. The temperature sensor(s) 116, 118 can be, for example, a thermometer, a thermistor, a thermocouple, a resistance thermometer, or any other temperature measuring device. As shown in FIG. 1A, a temperature sensor 116 can be located at or near an inlet of the heating chamber 102 and another temperature sensor 118 can be located at or near an outlet of the heating chamber 102. Each temperature sensor 116, 118 can be configured to detect the temperature of the fluid at the location of the temperature sensor 116, 118 and can transmit temperature data to the controller 114.

The controller 114 can be configured to receive data from various sensors and components (e.g., flow sensor 100, heating element 104, temperature sensors, 116, 118), determine actions to be performed by one or more components based on the received data, and output instructions to perform those actions. The controller 114 can be mounted on the fluid heating device 100 or can be located remotely from the fluid heating device 100. The controller 114 can be configured to regulate the flow of electric current to the one or more heating elements 104. The controller 114 can output a control signal directly to the heating element 104, and the control signal can include instructions regarding whether to permit flow of current to generate heat, how much current to permit, and/or how much heat to generate. The controller 114 can output a control signal to individually activate a single heating element 104. Alternatively, the controller 114 can output a control signal to activate some or all heating elements 104 simultaneously. The one or more heating element(s) 104 can receive power via electrical wires and can be configured to provide the instructed the desired amount of heat.

The controller 114 can regulate flow of electrical current to one or more heating elements 104 based on data received from a sensor or other component of the fluid heating system 100, such as an inlet temperature sensor 116, outlet temperature sensor 118, or flow sensor 110. For example, the controller 114 can determine, based on flow data received from the flow sensor 110, that water is being requested and can output instructions to the heating element 104 to engage. As another example, the controller 114 can determine, based on temperature data received from an inlet temperature sensor 116, that the temperature of incoming water is below a requested water temperature and can output instructions to the heating element 104 to heat the water an appropriate amount, depending on the incoming water temperature and the requested water temperature. As another example, the controller 114 can determine, based on based on temperature data received from an outlet temperature sensor 118, that the temperature of outgoing water is below a requested water temperature and can output instructions to the heating element 104 to heat the water an appropriate amount, depending on the incoming water temperature and the requested water temperature.

The controller 114 can be configured to control and regulate the temperature of the heating element 104. The outlet temperature sensor 118 can detect the temperature of the fluid flowing out of the fluid outlet 118 and can send a signal to the controller 114, allowing the controller 114 to ensure the temperature of the fluid is approximately the same temperature as the determined threshold set using the temperature controller 112. The fluid heating device 100 can further include a thermostat, which can optionally perform some or all of the functionalities of the controller 114.

The fluid heating device 100 can include an ultrasonic transducer 124. Alternatively, the fluid heating device 100 can include a plurality of ultrasonic transducers 124. The ultrasonic transducer(s) 124 can be integrated into the fluid heating device 100. Alternatively or in addition, the ultrasonic transducer(s) 124 can be attachable to the fluid heating device 100 such that the fluid heating device 100 can be retrofitted to include the ultrasonic transducers 124 (e.g., the ultrasonic transducer(s) 124 can be integrated into one or more ultrasonic transducer assemblies 122 that can be attached to the fluid heating device 100). The ultrasonic transducer 124 can convert electrical current into ultrasonic sound waves 202. Ultrasonic sound is sound that is above the typical human hearing range, and generally refers to sound having a frequency of 20 kilohertz (kHz) or more. The ultrasonic transducer 124 can be capable of both generating ultrasonic waves 202 and receiving ultrasonic vibrations. For example, the ultrasonic transducer 124 can include an ultrasonic transmitter and an ultrasonic receiver. The active element of an ultrasonic transducer 124 can be piezoelectric material, and in particular, a piezoelectric crystal, that can convert electrical energy to ultrasonic energy. The piezoelectric material can include lead zirconium titanite (PZT), lead titanate, bismuth titanate, piezoelectric single crystal and the like. The ultrasonic transducer 124 can receive ultrasonic energy that was generated when creating the ultrasonic sound wave 202 and convert the ultrasonic energy back to electrical energy, allowing for continuous cycles.

The ultrasonic transducer 124 can include piezoelectric material as the active element. The piezoelectric material can transmit a plurality of ultrasonic waves 202. The piezoelectric material can be configured to receive, detect, or measure a vibration or echo from the transmitted ultrasonic sound waves 202. The piezoelectric material can be disposed between a first metal block and a second metal block. The first block of metal can be a radiating cone. The first block of metal can have any useful shape or geometry, including but not limited to, a substantially conical shape, a substantially frustoconical shape, a substantially cylindrical shape, a substantially spherical shape, a substantially cubic shape, a substantially cylindrical shape, or a substantially cuboid shape. The second block of metal can be a resonant mass. The second block of metal can have any useful shape or geometry, including but not limited to, a substantially conical shape, a substantially frustoconical shape, a substantially cylindrical shape, a substantially spherical shape, a substantially cubic shape, a substantially cylindrical shape, or a substantially cuboid shape. The ultrasonic transducer 124 can also comprise one or more electrodes. The electrodes can be a conductive metal, including aluminum, brass, or stainless steel.

The piezoelectric material of the ultrasonic transducer 124 can have a substantially rectangular shape. The piezoelectric material can be positioned above a supporting membrane, and one or more electrodes can be positioned on each side of the piezoelectric material. The ultrasonic transducer assembly 122 can include one or more ultrasonic transducers 124 (e.g., one or more ultrasonic transmitters, one or more ultrasonic transmitters and one or more ultrasonic receivers), and the ultrasonic transducer assembly (or base) 122 can optionally include a board, sleeve, or some other substrate to which the ultrasonic transducer(s) 124 can be attached or affixed, an example of which is ultrasonic transducer assembly 122 illustrated in FIG. 1A. The ultrasonic transducer assembly 122 can include a sleeve or partial sleeve that can encase or envelop at least a portion of the heating chamber 102, such as illustrated in FIG. 1A, for example. The ultrasonic transducer assembly 122 can include material capable of facilitating transmission of ultrasonic sound waves 202. The ultrasonic transducer 124 can be positioned to direct outgoing ultrasonic waves 202 toward the heating chamber 102. The ultrasonic transducer assembly 122 can be positioned proximate to the heating element 104 such that the ultrasonic transducer 124 is positioned to direct outgoing ultrasonic waves toward the heating element 104. The ultrasonic transducer assembly 122 can be positioned proximate to the heating chamber 102, directly on an external surface of the heating chamber 102, or within the heating chamber 102. The ultrasonic transducer assembly 122 can be positioned such that one or more ultrasonic transducers 124 are in direct contact with the fluid.

As mentioned above, the fluid heating device 100 can include multiple ultrasonic transducers 124. As a non-limiting example, the fluid heating device 100 can include two ultrasonic transducers 124, as illustrated in FIG. 1A, but the inclusion of three, four, five, six, ten, or any other number of ultrasonic transducers 124 is contemplated. A separate ultrasonic transducer 124 can be directed to each heating element 104. Alternatively, two or more ultrasonic transducers 124 can be directed to a given heating element 104 or a single ultrasonic transducer 124 can be positioned to provide ultrasonic waves 202 to multiple heating elements 104.

Multiple ultrasonic transducers 124 can be arranged in an array to strategically provide efficient and effective descaling and prevention of chemical deposits through ultrasonic sound wave 202 generation. The plurality of ultrasonic transducers 124 can be arranged in an array such that each of the ultrasonic transducers 124 can output ultrasonic sound waves 202 directed toward a common location (e.g., a deposit of contaminant particles, a location at which contaminant particles are likely to deposit, attach, or adhere). The plurality of ultrasonic transducers 124 can be positioned such that the outputted ultrasonic sound waves 202 of each ultrasonic transducer 124 can target an area or portion of the heating chamber 102 at which contaminant particles 204 are likely to deposit. For example, areas having ridges or an undulating profile may be prone to facilitating deposits of contaminant particles 204. Other areas that can be prone to deposits of contaminant particles 204 can include portions of the heating chamber 102, inlet 106, outlet 108, or any other area that bends or otherwise changes the flow of the fluid. When fluid changes direction in a bend, fluid pressure can change, resulting in the potential for more mineral contaminant buildup. One or more ultrasonic transducers 124 can be positioned equidistantly on the ultrasonic transducer assembly 122 and/or can be positioned equidistantly along the heating chamber 102, which can encourage even transmittal of ultrasonic sound waves 202 throughout the heating chamber 102.

The ultrasonic transducer 124 can be in electrical communication with the controller 114, and the controller 114 can be configured to control or operate the ultrasonic transducer 124. The controller 114 can include a processor capable of executing stored instructions and operating upon stored data to perform certain functions related to the disclosed examples and embodiments. The controller 114 can include one or more storage devices configured to store information. the controller 114 can include memory that includes instructions to enable the processor to execute one or more applications, such as server applications, network communication processes, and any other type of application or software known to be available on computer systems. Alternatively, the instructions, application programs, etc. can be stored in an external storage or available from a memory over a network. The one or more storage devices can be a volatile or non-volatile, magnetic, semiconductor, tape, optical, removable, non-removable, or other type of storage device or tangible computer-readable medium.

Facilitating communication between components of the fluid heating device 100, including between the temperature sensor, flow sensor, ultrasonic transducer, and controller, can be through a network of any suitable type, including individual connections via the internet such as cellular or WiFi networks. The network can connect terminals using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Benefits of a network-based communication can include real-time data acquisition that is accurate and reliable and real-time data transmission.

The controller 114 can include a graphical interface. The graphical interface can be in communication with and displayed using a mobile computing device including a smart phone, tablet computer, wearable device, portable laptop computer, wearable augment reality device, or other mobile computing device, or a stationary device including a desktop computer.

The controller 114 can activate the ultrasonic transducer 124 such that electrical current is transferred to one or more electrodes of the ultrasonic transducer 124 and the ultrasonic transducer 124 is caused to output ultrasonic waves 202. The controller 114 can receive flow data from the flow sensor 110 and temperature data from the temperature sensors, 116, 118. The controller 114 can determine whether the heating element 104 is currently engaged (e.g., based on signals received from the heating element 104, based on the last instruction outputted by the controller 114 to the heating element 104). The controller 114 can determine whether fluid is flowing through the heating chamber 102 based on the flow data, and the controller 114 can determine whether the heating element 104 is engaged based on the temperature data or another determination of whether the heating element 104 is currently engaged.

In response to determining that fluid is flowing through the heating chamber 102 and/or that the heating element 104 is engaged, the controller 114 can activate the ultrasonic transducer 124. The controller 114 can be configured to engage the ultrasonic transducer 124 for a predetermined amount of time after the heating element 104 has disengaged (e.g., after the heating element has finished heating the water and has turned off). For example, the controller 114 can instruct the ultrasonic transducer 124 to output ultrasonic sound waves 202 for 5 seconds, 10 seconds, 30 seconds, 60 seconds, 2 minutes, 5 minutes, or any other time period after the heating element 104 has disengaged. Alternatively or in addition, the controller 114 can be configured to activate the ultrasonic transducer 124 on a predetermined schedule (e.g., once every hour, once every 6 hours, once every day). The controller 114 can instruct the ultrasonic transducer 124 to provide a constant output of ultrasonic waves 202 while the ultrasonic transducer 124 is engaged. Alternatively, the controller 114 can instruct the ultrasonic transducer 124 to provide a pulsing output of ultrasonic waves 202 while the ultrasonic transducer 124 is engaged. A pulsing output can refer to, for example, alternating periods of outputting and not outputting ultrasonic waves 202. The controller 114 can be configured to determine the appropriate duration and type of ultrasonic wave output (e.g., a constant output of ultrasonic waves 202, a pulsing output of ultrasonic waves 202, or some other type of ultrasonic wave 202 output) based at least in part on received flow data, temperature data, and signals received from the heating element 104. Optionally, the ultrasonic transducer assembly 122 can include a contaminant sensor that is configured to detect the presence and amount of one or more contaminants in the fluid flowing through the heating chamber 102 and transmit contaminant data to the controller 114. The controller 114 can receive the contaminant data and determine, based at least in part on the contaminant data, the appropriate duration and type of ultrasonic wave output.

The flow of electrical current can cause the piezoelectric material to change shape rapidly, which can produce ultrasonic sound waves 202. Conversely, when an ultrasonic sound wave 202 echoes back to the piezoelectric material, a flow of electrical current can be emitted. The same ultrasonic transducer 124 can receive the vibration. Alternatively, a separate ultrasonic transducer 124 can receive the vibration. The electrical communication between the ultrasonic transducer 124 and the controller 114 can control the removal and prevention of chemical deposits of the heating elements 104 and heating chambers 102.

Figure 2:
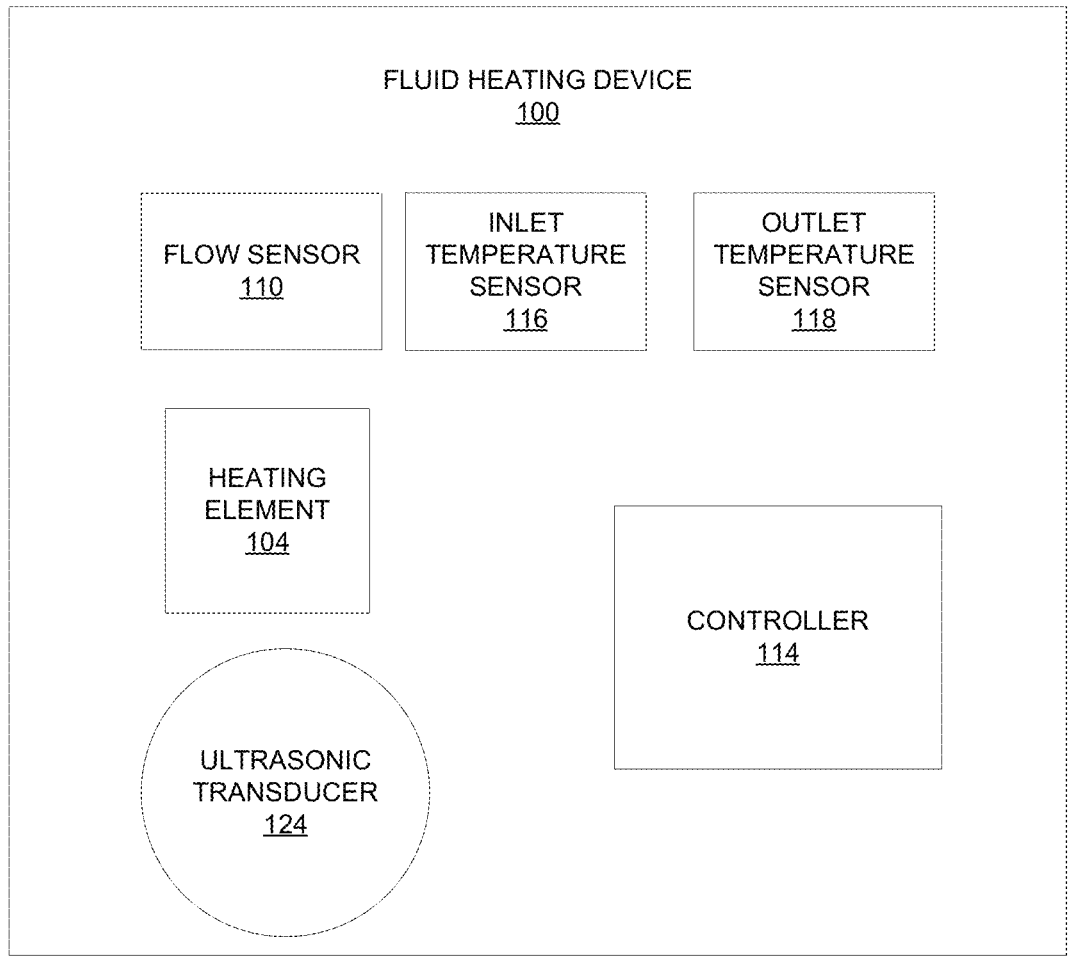
FIG. 2 is a schematic diagram illustrating the components of a fluid heating device in communication with a controller, according to the disclosed technology.
Figure 3:
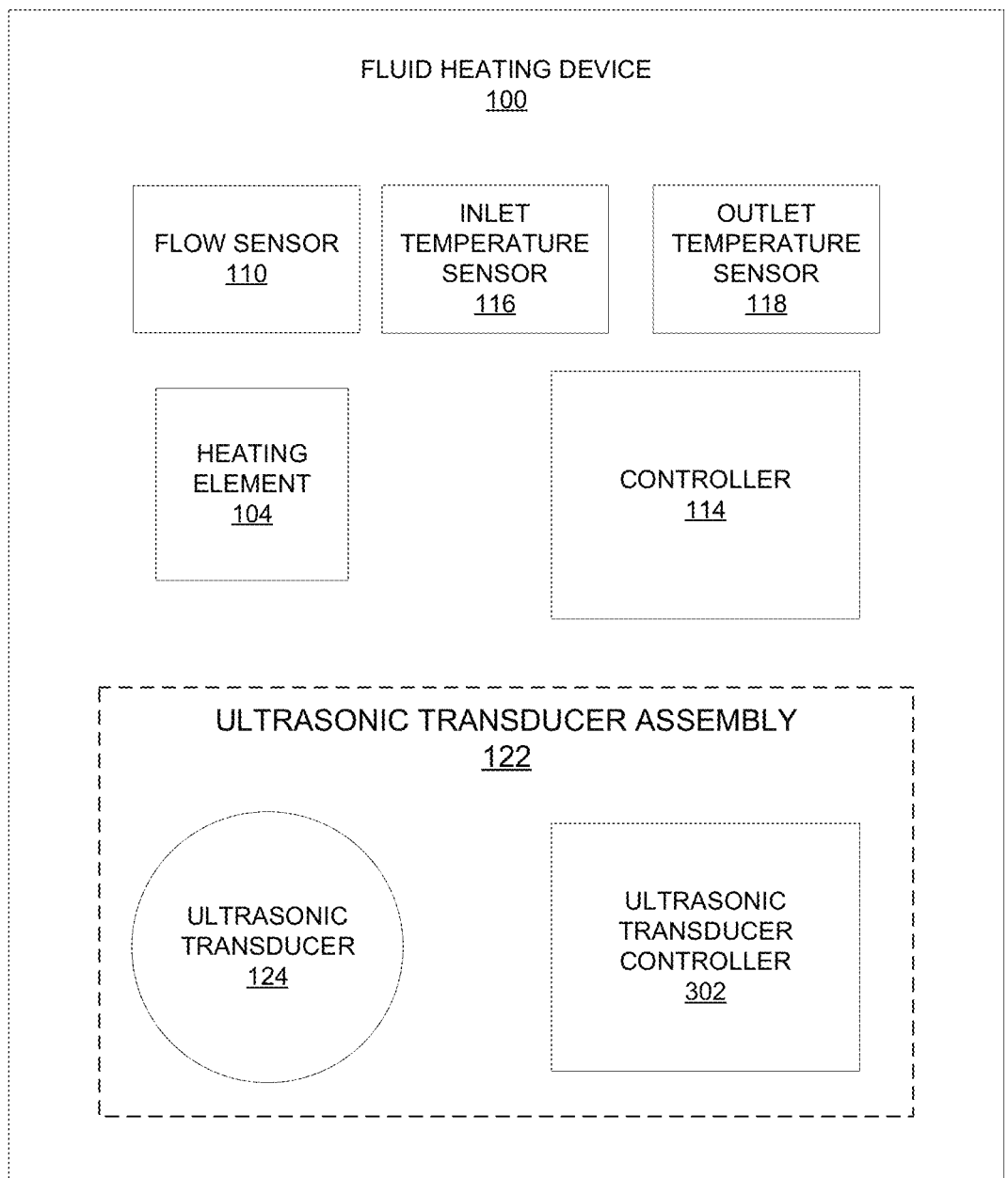
FIG. 3 is a schematic diagram illustrating the components of a fluid heating device in communication with a controller and an ultrasonic transducer controller, according to the disclosed technology.

Referring to FIG. 2, a single controller 114 can be configured to perform all of the controller functions discussed herein. Alternatively, referring to FIG. 3, the ultrasonic transducer assembly 122 can include a dedicated ultrasonic transducer controller 302 that is configured to receive various data from the controller 114 of the fluid heating device 100 and/or data directly from the various sensors and components of the fluid heating device 100. Such a configuration can facilitate, for example, installation of the ultrasonic transducer assembly 122 on existing fluid heating devices 100.

Figure 4:
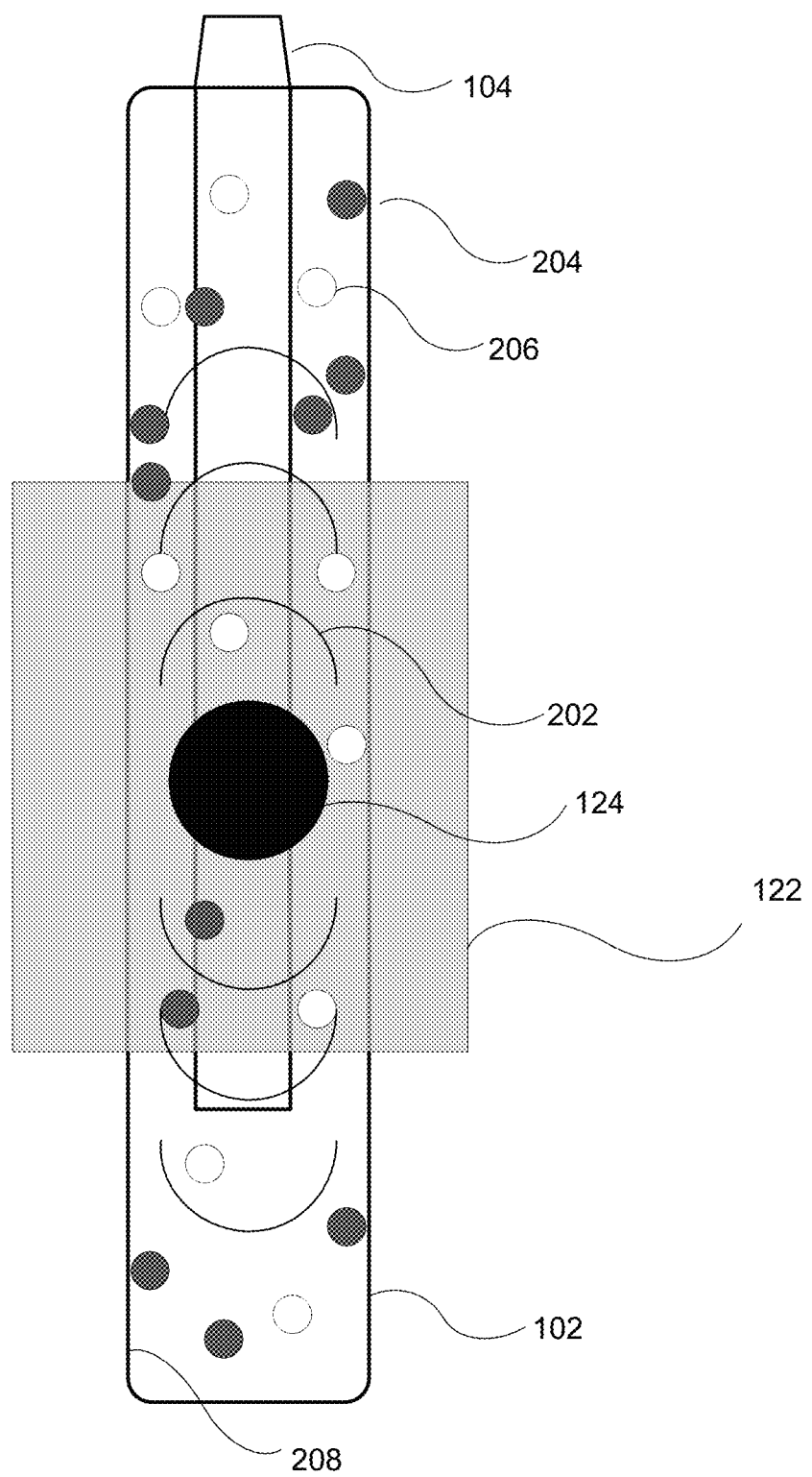
FIG. 4 is a diagram of an ultrasonic transducer transmitting ultrasonic sound waves within a heating chamber, according to the disclosed technology.

FIG. 4 illustrates an example ultrasonic transducer 124 transmitting ultrasonic sound waves 202 into a heating chamber 102 and towards a heating element 104. The ultrasonic transducer 124 can transmit ultrasonic sound waves 202 at a predetermined or variable frequency and/or a predetermined or variable interval. The predetermined frequency can be determined based on, as non-limiting examples, an estimated amount of contaminant particles 204, the size of the heating chamber 102 and/or the heating element(s) 104, the type of material of the heating chamber 102 and/or the heating element(s) 104, the type and number and position of ultrasonic transducers 124, the type of fluid, the temperature of the fluid, and the flow rate of the fluid. Alternatively, the predetermined frequency can be default values or can be user-inputted values.

The variable frequency can be adjusted by the controller 114 (or the controller 302) based on a return frequency detected by the ultrasonic transducer 124. That is, the ultrasonic transducer 124 can include a receiver configured to detect and measure sound waves and transmit detected frequency data to the controller 114, 302. The detected sound waves can correspond to previously transmitted ultrasonic sound waves 202. The detected frequency data can be indicative of the amount of time between the output of an ultrasonic sound wave 202 and the ultrasonic transducer's 124 detection of an echo or bounce back sound wave associated with the initial ultrasonic sound wave 202. The controller 114, 302 can use this information to determine an approximation of the amount and/or location of the contaminant particles 204 disposed on the heating elements 104 and/or within the heating chamber 102. The controller 114, 302 can thus output instructions to the ultrasonic transducer 124 to adjust the frequency of the outputted ultrasonic sound waves 202 based on the detected sound waves.

The predetermined or variable frequency can be between 1 kHz and 50 kHz. The predetermined interval can be determined based on, as non-limiting examples, an estimated amount of contaminant particles 204, the size of the heating chamber 102 and/or the heating element(s) 104, the type of material of the heating chamber 102 and/or the heating element(s) 104, the type and number and position of ultrasonic transducers 124, the type of fluid, the temperature of the fluid, and the flow rate of the fluid. Alternatively, the predetermined interval can be default values or can be user-inputted values.

The variable interval can be adjusted by the controller 114 (or the controller 302) based on a return interval detected by the ultrasonic transducer 124. That is, the ultrasonic transducer 124 can include a receiver, and the receiver can be configured to detect and measure sound waves and transmit detected sound wave data to the controller 114, 302. The detected sound wave data can be indicative of detected sound waves, and the detected sound waves can be return or "bounceback" waves that correspond to previously transmitted ultrasonic sound waves 202. Stated otherwise, the detected interval data can be indicative of the amount of time between the output of an ultrasonic sound wave 202 and the ultrasonic transducer's 124 detection of an echo or bounceback sound wave associated with the initial ultrasonic sound wave 202. Based on the detected sound wave data, the controller 114, 302 can determine or approximate the amount and/or location of contamination particles 204 disposed on the heating elements 104 and/or within the heating chamber 102. The controller 114, 302 can thus output instructions to the ultrasonic transducer 124 to adjust the interval of the outputted ultrasonic sound waves 202 based on the detected sound waves.

The predetermined or variable interval can begin once the controller 114, 302 detects that fluid is flowing through the heating chamber 102. Alternatively, the predetermined or variable interval can begin once the controller 114, 302 determines that the heating element 104 has disengaged. Alternatively, the predetermined or variable interval can begin once the controller 114, 302 determines that fluid has stopped flowing through the heating chamber 102. Thus, as an example, the controller 114, 302 can be configured to engage the ultrasonic transducer 124 while fluid is flowing through the heating chamber 102 and/or engage the ultrasonic transducer 124 for a certain interval (predetermined or variable) that begins once the fluid stops flowing through the heating chamber and/or once the heating element 104 disengages. The predetermined or variable interval can be between approximately one second to approximately thirty minutes. For example, the predetermined or variable interval can be one second to several minutes depending on temperature of the heating chamber 102, once the temperature of the heating chamber 102 is below a predetermined value.

The ultrasonic transducer 124 can transmit ultrasonic sound waves 202 at one or more predetermined or variable frequencies and oscillate between the one or more frequencies for one or more predetermined or variable intervals, remaining at a first frequency for a first interval, remaining at a second frequency for a second interval, and continuing for the total determined frequencies and determined intervals for each respective determined frequency. This cycle can repeat. As an example, the fluid heating device 100 can initiate a process in which a plurality of ultrasonic sound waves 202 are transmitted at a frequency of 25 kHz for 30 seconds and immediately followed by a plurality of ultrasonic sound waves 202 being transmitted at a frequency of 45 kHz for 30 seconds. This cycle can repeat a predetermined number of times over a predetermined interval (e.g., ten times over ten minutes).

The plurality of ultrasonic sound waves 202 transmitted through the fluid of the heating chamber 102 can create a plurality of cavitation bubbles 206. Cavitation bubbles 206 can be filled primarily with gas that is mainly air and vapor and commonly appear and develop when a fluid subjected to low pressure. The plurality of cavitation bubbles 206 can form and grow from a microscopic nucleus to an unstable size when a fluid is put in a significant state of tension due to the generation of a plurality of ultrasonic sound waves 202.

The acoustic pressure generated from a plurality of ultrasonic sound waves 202 can result in significant stress in a fluid. An ultrasonic sound wave 202 can comprise a compression and refraction cycle. During the refraction portion of the cycle, the pressure in the fluid is negative. During the compression portion of the cycle, the pressure in the fluid is positive. A plurality of ultrasonic sound waves 202 being transmitted into the fluid can cause the magnitude of the negative pressure areas to continue to increase. Eventually, the magnitude of the negative pressure can become so great the fluid will fracture, causing the production of a microscopic nucleus of a cavitation bubble 206.

Once a cavitation bubble 206 is formed, the cavitation bubble 206 can continue to grow. The cavitation bubble 206 can grow from a small nucleus to many times its original size. During each refraction cycle the cavitation bubble 206 can grow. Although the cavitation bubble 206 can decrease in size to some extent during each compression cycle, the general trend is that over the plurality of compression and refraction cycles when a plurality of ultrasonic sound waves 202 are generated, the cavitation bubble 206 can increase in size. The cavitation bubble 206 typically grows until the cavitation bubble 206 reaches an unstable size.

Generally, the lower the applied frequency, the larger the cavitation bubble 206, whereas, the higher the applied frequency, the smaller the cavitation bubble 206. When frequency is low, the cavitation bubble 206 can become larger and release more energy upon implosion. Although more energy can be released upon implosion, less implosion events occur. When frequency is high, the cavitation bubble 206 is smaller and releases less energy upon implosion.

Figure 5:
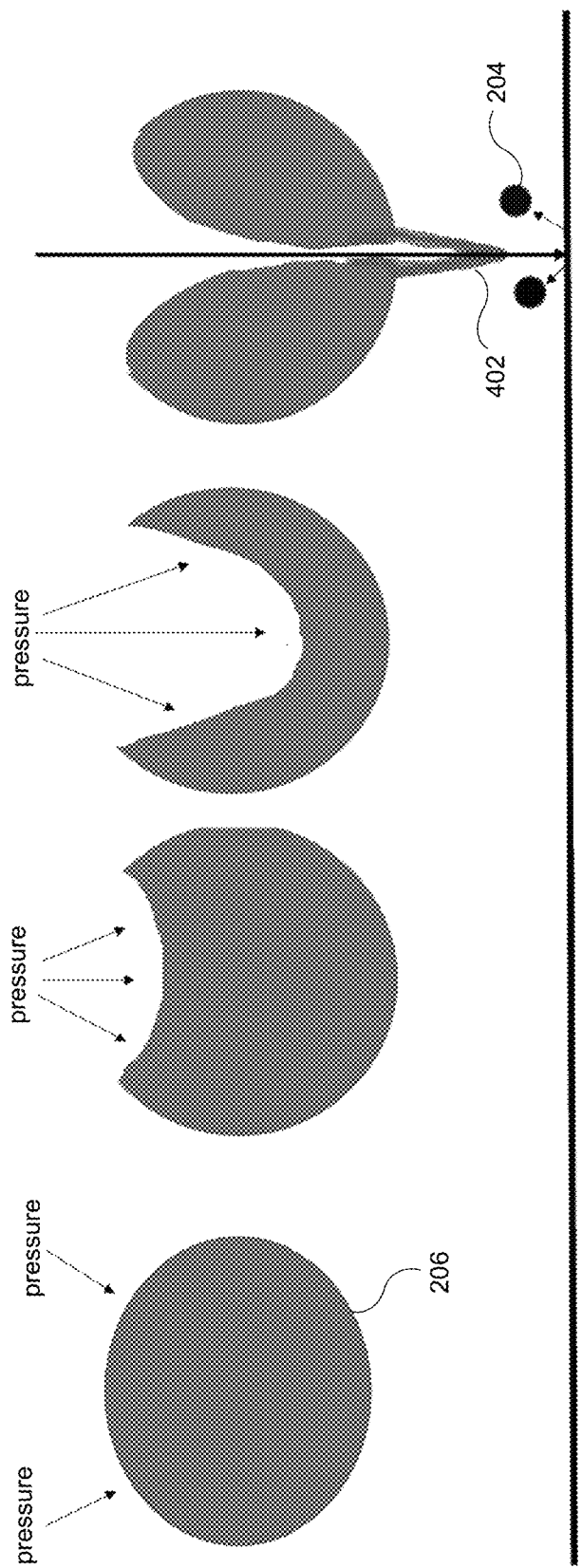
FIG. 5 illustrates a process of cavitation bubble implosion, according to the disclosed technology.

FIG. 5 illustrates a diagram of the implosion of a cavitation bubble 206. The implosion, or collapse, of a cavitation bubble 206 can produce momentary extremes of pressure and temperature. A cavitation bubble 206 can contain a partial vacuum. The cavity within a cavitation bubble 206 can comprise gas, in the form of air mainly, and vapor. As the pressure around the cavitation bubble 206 increases, eventually the cavitation bubble 206 becomes unstable, and fluid from the outside rushes into the inside of the cavitation bubble 206. When this occurs, a jet 402 of fluid can be created. The jet 402 of fluid can have a velocity of 250 meters per second. The jet 402 can be as small as approximately one-tenth the cavitation bubble 206 size. When this implosion occurs, the gases inside the cavitation bubble 206 are compressed and subsequently can cause a rise in temperature. The fluid surrounding the cavitation bubble 206 can rise as a result of the implosion of the cavitation bubble 206. The combination of high pressure within the imploding cavitation bubble 206, high temperature within the imploding cavitation bubble 206 and the surrounding fluid, and velocity of the jet 402 at which the jet 402 contacts an interior wall 208 of the heating chamber 102 or heating element 104, can displace one more contaminant particles 204 adhered to an interior wall 208 of the heating chamber 102 or heating element 104. The small size of the jet 402 and the large amount of energy generated, allows displacement of contaminant particles 204 that can be located in small crevices or ridges within the heating chamber 102. This process can effectively and efficiently prevent contaminant particles 204 from adhering to the interior walls 208 of the heating chamber 102 or the heating element 104, resulting in the prevention of scale buildup.

The displaced plurality of contaminant particles 204 can flow through the heating chamber 102 and out the fluid outlet 108. a diameter of the contaminant particle 204 is smaller than a diameter of an aperture of an aerator mesh, allowing the contaminant particle 204 to flow easily through the fluid outlet 108 and out of a dispensing faucet. The common minerals that comprise the plurality of contaminant particles 204 include calcium and magnesium, which are generally safe for the human body. Therefore, the plurality of contaminant particles 204 can flow through the fluid heating device 100 and out through a faucet causing no adverse effects for humans. When the contaminant particles 206 flow through the fluid heating device 100 without adhering to the interior walls 208 of the heating chambers 102 or the heating elements 104, the buildup of contaminant particles 204 leading to scaling can be reduced and can be prevented.

What is claimed is:

1. A fluid heating device comprising:
 a heating chamber in fluid communication with a heating element;
 one or more ultrasonic transducers in communication with the heating chamber, at least one of the one or more ultrasonic transducers being configured to output ultrasonic sound waves into the heating chamber, at least one of the one or more ultrasonic transducers being configured to receive echoes of the ultrasonic sound waves, and at least one of the one or more ultrasonic transducers being configured to output sound wave data associated with the received echoes of the ultrasonic sound waves; and
 a controller in electrical communication with the one or more ultrasonic transducers, the controller configured to:
 receive the sound wave data from the at least one of the one or more ultrasonic transducers;
 based on a difference in time between the output of an ultrasonic sound wave and a detection of an echo of the ultrasonic sound wave, determine an approximate level of contamination within the heating chamber;
 determine whether the heating element is disengaged; and
 in response to determining the approximate level of contamination and determining the heating element is disengaged, output instructions to the one or more ultrasonic transducers to output the ultrasonic sound waves at a variable frequency for a variable interval, wherein the variable frequency and variable interval are determined by the approximate level of contamination within the heating chamber.

2. The fluid heating device of claim 1, wherein each of the one or more ultrasonic transducers is attached to an ultrasonic transducer assembly.

3. The fluid heating device of claim 2, wherein the ultrasonic transducer assembly is positioned on an external surface of the heating chamber.

4. The fluid heating device of claim 1, wherein each of the one or more ultrasonic transducers is positioned within the heating chamber.

5. The fluid heating device of claim 1, wherein each of the one or more ultrasonic transducers is positioned proximate to a bottom portion of the heating chamber and configured to direct the ultrasonic sound waves towards the heating element.

6. The fluid heating device of claim 1, wherein the one or more ultrasonic transducers are a plurality of ultrasonic transducers, the plurality of ultrasonic transducers being positioned equidistantly within the heating chamber.

7. The fluid heating device of claim 1, wherein the one or more ultrasonic transducers are a plurality of ultrasonic transducers arranged in an array such that each ultrasonic transducer outputs ultrasonic sound waves that substantially converge at a common target.

8. The fluid heating device of claim 1, wherein the controller is further configured to:
 receive flow data from one or more flow sensors;
 determine, based at least in part on the flow data, whether fluid is flowing through the heating chamber; and responsive to determining that fluid has stopped flowing through the heating chamber, output instructions to the one or more ultrasonic transducers to output ultrasonic waves.

9. The fluid heating device of claim 1, wherein the at least one of the one or more ultrasonic transducers configured to output ultrasonic sound waves into the heating chamber is the same as the at least one of the one or more ultrasonic transducers configured to receive echoes of the ultrasonic sound waves.

10. The fluid heating device of claim 1, wherein the at least one of the one or more ultrasonic transducers configured to output ultrasonic sound waves into the heating chamber is different than the at least one of the one or more ultrasonic transducers configured to receive echoes of the ultrasonic sound waves.

11. The fluid heating device of claim 1, wherein the one or more ultrasonic transducers are a plurality of ultrasonic transducers arranged in an array such that each of the ultrasonic transducers outputs ultrasonic sound waves targeting an area or portion of the heating chamber.

* * * * *